United States Patent
Kashihara et al.

(10) Patent No.: US 11,753,519 B2
(45) Date of Patent: Sep. 12, 2023

(54) CONDUCTIVE ROLL FOR ELECTROPHOTOGRAPHIC MACHINE

(71) Applicant: Sumitomo Riko Company Limited, Aichi (JP)

(72) Inventors: Shinkichi Kashihara, Aichi (JP); Takeru Horiuchi, Aichi (JP); Naoki Akira, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 540 days.

(21) Appl. No.: 17/088,590

(22) Filed: Nov. 4, 2020

(65) Prior Publication Data

US 2021/0054167 A1   Feb. 25, 2021

Related U.S. Application Data

(63) Continuation of application No. PCT/JP2019/018383, filed on May 8, 2019.

(30) Foreign Application Priority Data

Jun. 1, 2018   (JP) ................. 2018-105750

(51) Int. Cl.
*G03G 15/02* (2006.01)
*C08K 3/04* (2006.01)
(Continued)

(52) U.S. Cl.
CPC .................. *C08K 3/04* (2013.01); *C08K 5/00* (2013.01); *C08K 5/14* (2013.01); *C08L 9/00* (2013.01);
(Continued)

(58) Field of Classification Search
CPC .... G03G 15/02; G03G 15/0233; G03G 15/08; G03G 15/16; C08K 3/04; C08K 5/00;
(Continued)

(56) References Cited

U.S. PATENT DOCUMENTS

| | | | |
|---|---|---|---|
| 2011/0176833 A1* | 7/2011 | Harada | G03G 15/0233 399/176 |
| 2013/0288869 A1* | 10/2013 | Tajima | G03G 15/0233 399/176 |

FOREIGN PATENT DOCUMENTS

JP   H05134515   5/1993

OTHER PUBLICATIONS

"International Search Report (Form PCT/ISA/210)" of PCT/JP2019/018383, dated Jul. 9, 2019, with English translation thereof, pp. 1-4.

* cited by examiner

*Primary Examiner* — Sophia S Chen
(74) *Attorney, Agent, or Firm* — JCIPRNET

(57) ABSTRACT

Provided is a conductive roll for an electrophotographic machine. The conductive roll is a charging roll and includes a shaft body, and an elastic body layer formed on an outer periphery of the shaft body. The elastic body layer is a crosslinked body of a composition containing a diene-based polymer (a), a sulfur or peroxide crosslinking agent (b), carbon black (c), and a coupling agent (d). (c) has a specific surface area of 40 to 300 m²/g. (d) is a coupling agent having a $NHR^1$ group and a $SSO_3H$ group, or a coupling agent having a $NHR^1$ group and an ene structure (where $R^1$ is H or a hydrocarbon group having 1 to 8 carbon atoms). The contents of (c) and (d) in the composition are respectively 10 to 45 parts by mass and 0.5 to 20 parts by mass with respect to 100 parts by mass of (a).

1 Claim, 2 Drawing Sheets

(51) Int. Cl.
*C08K 5/14* (2006.01)
*C08L 9/00* (2006.01)
*F16C 13/00* (2006.01)
*C08K 5/00* (2006.01)
*G03G 15/08* (2006.01)
*G03G 15/16* (2006.01)

(52) U.S. Cl.
CPC .......... *F16C 13/00* (2013.01); *G03G 15/0233* (2013.01); *G03G 15/08* (2013.01); *G03G 15/16* (2013.01)

(58) Field of Classification Search
CPC .......... C08K 5/3415; C08K 5/14; C08K 5/41; C08K 2201/006; C08L 7/00; C08L 9/00; F16C 13/00
See application file for complete search history.

CONDUCTIVE ROLL FOR ELECTROPHOTOGRAPHIC MACHINE

CROSS-REFERENCE TO RELATED APPLICATION

This application is a continuation of PCI International Application No. PCI/JP2019/018383, filed on May 8, 2019, which claims priority under 35 U.S.C § 119(a) to Japanese Patent Application No. 2018-105750, filed on Jun. 1, 2018. Each of the above application(s) is hereby expressly incorporated by reference, in its entirety, into the present application.

BACKGROUND

Technical Field

The disclosure relates to a conductive roll for an electrophotographic machine, which is suitably used in an electrophotographic machine such as a copier, a printer, a fax machine or the like that employs electrophotography.

Related Art

In an electrophotographic machine such as a copier, a printer, a fax machine or the like that employs electrophotography, a conductive roll, such as a charging roll, a development roll, a transfer roll, a toner supply roll or the like, is arranged around a photosensitive drum. As the conductive roll, there is known one including a conductive elastic body layer on an outer periphery of a shaft body composed of a core bar. A conductive agent for providing conductivity is blended in the elastic body layer. The conductive agent includes an ionic conductive agent and an electronic conductive agent. In ionic conduction as one of the forms of conduction, the conductive agent is gradually consumed due to charge polarization during energization, causing an increase in resistance. In addition, the resistance varies greatly depending on the environment. Therefore, electronic conduction is desirable for the sake of resistance stability.

PATENT DOCUMENTS

[Patent Document 1] Japanese Patent Laid-open No. H05-134515

The conductive roll of the electrophotographic machine rotates in a state of being in contact with a counterpart member. When a rotational load is applied to the elastic body layer of the conductive roll, the resistance may increase even in electronic conduction, and stable resistance cannot be ensured. Patent Document 1 describes that, in a semiconductive elastic body layer of a charged body, carbon black being a conductive substance and a coupling agent being a dispersion stabilizer of the conductive substance are blended, and variation in electrical resistance of the charged body is reduced. However, in the configuration of Patent Document 1, in the case of application of a rotational load to an electroconductive elastic body layer, the resistance stability cannot be ensured in the long term.

The disclosure provides a conductive roll for an electrophotographic machine, which is excellent in resistance stability in the long term in the case of application of a rotational load to an electroconductive elastic body layer.

SUMMARY

A conductive roll for an electrophotographic machine according to the disclosure includes a shaft body, and an elastic body layer formed on an outer periphery of the shaft body. The conductive roll is a charging roll. The elastic body layer is a crosslinked body of a composition containing a diene-based polymer (a), a crosslinking agent (b), a carbon black (c), and a coupling agent (d), in which the crosslinking agent (b) is a sulfur crosslinking agent or a peroxide crosslinking agent; the carbon black (c) has a specific surface area ranging from 40 $m^2/g$ to 300 $m^2/g$, and a content of the carbon black (c) in the composition ranges from 10 parts by mass to 45 parts by mass with respect to 100 parts by mass of the diene-based polymer (a); and the coupling agent (d) is (d1) or (d2) below, and a content of the coupling agent (d) in the composition ranges from 0.5 part by mass to 20 parts by mass with respect to 100 parts by mass of the diene-based polymer (a):

(d1) a coupling agent having a $NHR^1$ group and a $SSO_3H$ group;

(d2) a coupling agent having a $NHR^1$ group and an ene structure (where $R^1$ is H or a hydrocarbon group having 1 to 8 carbon atoms).

DESCRIPTION OF THE EMBODIMENTS

Hereinafter, the disclosure is described in detail.

Figure 1A:
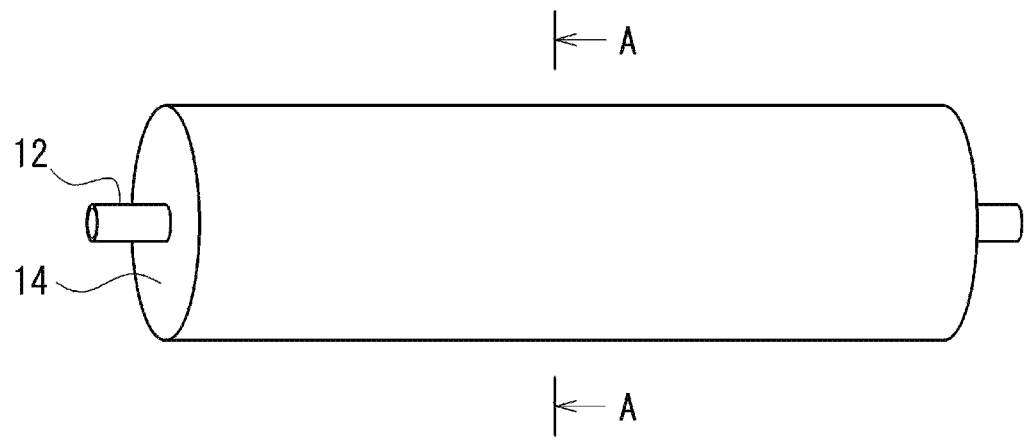
FIG. 1A is a schematic external view of a conductive roll for an electrophotographic machine according to one embodiment of the disclosure.
Figure 1B:
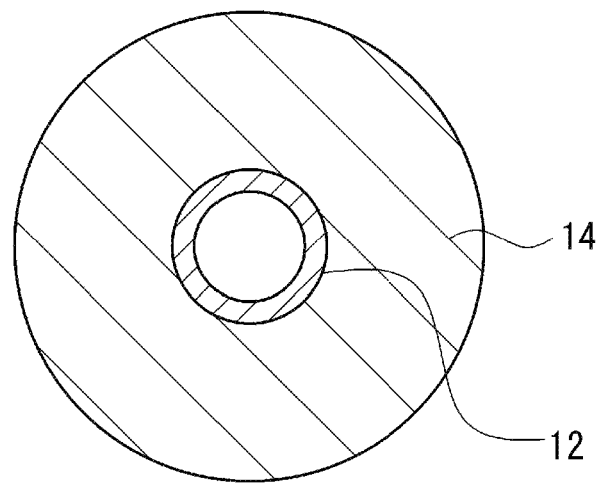
FIG. 1B is a sectional view of FIG. 1A taken along line A-A.

FIG. 1A and FIG. 1B show a conductive roll according to one embodiment of the disclosure. A conductive roll 10 shown in FIG. 1A and FIG. 1B has a configuration in which an elastic body layer 14 is provided as a single layer on an outer periphery of a shaft body 12. The elastic body layer 14 is a base layer of the conductive roll 10. The elastic body layer 14 is a layer that appears on a surface of the conductive roll 10.

The elastic body layer 14 is a crosslinked body of a composition containing the following (a) to (d). The elastic body layer 14 is composed of a conductive rubber elastic body:

a diene-based polymer (a);
a crosslinking agent (b);
carbon black (c); and
a coupling agent (d).

The diene-based polymer (a) is a polymer that uses a diene as a monomer, has an ene structure in the polymer, and is a polymer that can be crosslinked by the crosslinking agent (b). Examples of the diene-based polymer include natural rubber (NR), isoprene rubber (IR), butadiene rubber (BR), styrene butadiene rubber (SBR), styrene isoprene rubber (SIR), styrene butadiene styrene block copolymer (SBS), styrene isoprene styrene block copolymer (SIS), acrylonitrile butadiene rubber (NBR), butyl rubber (IIR), halogenated butyl rubber (Br-IIR, Cl-IIR), chloroprene rubber (CR), ethylene-propylene-diene rubber (EPDM), and so on. These may be used alone or in combination of two or more as the diene-based polymer (a). Among them, NBR is preferable from the viewpoint that volume resistivity of the composition is particularly likely to be lowered.

The crosslinking agent (b) is a crosslinking agent for the diene-based polymer (a). The crosslinking agent (b) is composed of a sulfur crosslinking agent or a peroxide crosslinking agent.

Examples of the sulfur crosslinking agent include a conventionally known sulfur crosslinking agent, such as powdered sulfur, precipitated sulfur, colloidal sulfur, surface-treated sulfur, insoluble sulfur, sulfur chloride, a thiuram-based vulcanization accelerator, a polymeric polysulfide, and so on.

Examples of the peroxide crosslinking agent include a conventionally known peroxide crosslinking agent, such as a peroxyketal peroxide, a dialkyl peroxide, a peroxy ester, a ketone peroxide, peroxydicarbonate, a diacyl peroxide, a hydroperoxide, and so on.

Considering the hardness or degree of crosslinking of the elastic body layer 14, in the above composition, the content of the crosslinking agent (b) preferably ranges from 0.5 part by mass to 7.0 parts by mass, more preferably ranges from 1.0 parts by mass to 5.0 parts by mass, with respect to 100 parts by mass of the diene-based polymer (a).

The carbon black (c) has a specific surface area ranging from 40 $m^2/g$ to 300 $m^2/g$. Accordingly, the carbon black (c) is likely to interact with the coupling agent (d). From this viewpoint, the specific surface area of the carbon black (c) more preferably ranges from 50 $m^2/g$ to 200 $m^2/g$, even more preferably ranges from 100 $m^2/g$ to 180 $m^2/g$. The specific surface area of the carbon black (c) can be measured by a nitrogen adsorption method.

In the above composition, the content of the carbon black (c) preferably ranges from 10 parts by mass to 45 parts by mass, more preferably ranges from 15 parts by mass to 40 parts by mass, and even more preferably ranges from 15 parts by mass to 30 parts by mass, with respect to 100 parts by mass of the diene-based polymer (a). Since the content of the carbon black (c) is 10 parts by mass or more with respect to 100 parts by mass of the diene-based polymer (a), the resistance can be lowered. In addition, since the content of the carbon black (c) is 45 parts by mass or less with respect to 100 parts by mass of the diene-based polymer (a), the hardness does not become excessively high and a nip with a photosensitive drum can be stabilized.

The coupling agent (d) is (d1) or (d2) below:
(d1) a coupling agent having a $NHR^1$ group and a $SSO_3H$ group;
(d2) a coupling agent having a $NHR^1$ group and an ene structure (where $R^1$ is H or a hydrocarbon group having 1 to 8 carbon atoms).

Since the $NHR^1$ group of (d1) or (d2) has active hydrogen bonded to a nitrogen atom, the $NHR^1$ group reacts with a surface functional group (carboxylic acid group) of the carbon black (c) and forms a chemical bond. The $SSO_3H$ group of (d1) generates a sulfur radical. The generated sulfur radical reacts with the ene structure of the diene-based polymer (a) and forms a chemical bond. The ene structure of (d2) forms a chemical bond with the ene structure of the diene-based polymer (a) by the crosslinking agent (b). Then, since the chemical bonds are formed between (a) and (d1) and between (c) and (d1), and also between (a) and (d2) and between (c) and (d2), the bonding between (a) and (c) is strengthened. Even in the case of application of a rotational load to the elastic body layer 14, interfacial peeling is suppressed between (a) and (c), and a conductive path by means of (c) is maintained. Hence, even in the case of application of a rotational load to the elastic body layer 14, an increase in resistance is suppressed, and excellent resistance stability is achieved in the long term.

The ene structure of (d2) is a carbon-carbon double bond site, and may be at a terminal of or inside (d2).

(d1) may be represented by, for example, general formula (1) below:

$$HR^1N-R^2-SSO_3H \qquad (1)$$

$R^1$ is H or a hydrocarbon group having 1 to 8 carbon atoms, and $R^2$ is a divalent hydrocarbon chain having 1 to 8 carbon atoms. $R^1$ is more preferably H or a hydrocarbon group having 1 to 4 carbon atoms. $R^2$ is more preferably H or a divalent hydrocarbon chain having 1 to 4 carbon atoms.

(d2) may be represented by, for example, general formula (2) below:

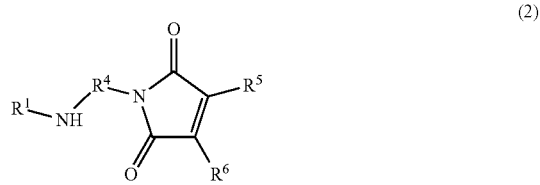

$R^1$ is H or a hydrocarbon group having 1 to 8 carbon atoms, $R^4$ is a divalent hydrocarbon chain having 1 to 8 carbon atoms, and $R^5$ and $R^6$ are each H or a hydrocarbon group having 1 to 8 carbon atoms. $R^1$ is more preferably H or a hydrocarbon group having 1 to 4 carbon atoms. $R^5$ and $R^6$ are each more preferably H or a hydrocarbon group having 1 to 4 carbon atoms. $R^5$ and $R^6$ may be groups having the same structure or groups having different structures.

(d2) may be a ring-opened product of a compound represented by the above general formula (2). The ring-opened product can be obtained by hydrolyzing the compound represented by the above general formula (2) in an alkali.

In (d1) and (d2), examples of the hydrocarbon group include an aliphatic hydrocarbon group, an alicyclic hydrocarbon group, an aromatic hydrocarbon group, a hydrocarbon group containing an aromatic ring, a hydrocarbon group containing an alicyclic ring. Examples of the divalent hydrocarbon chain include a divalent aliphatic hydrocarbon chain, a divalent alicyclic hydrocarbon chain, a divalent aromatic hydrocarbon chain, a hydrocarbon chain containing a divalent aromatic ring, a hydrocarbon chain containing a divalent alicyclic ring.

In the above composition, the content of the coupling agent (d) preferably ranges from 0.5 part by mass to 20 parts by mass, more preferably ranges from 2.0 parts by mass to 7.0 parts by mass, and even more preferably ranges from 2.0 parts by mass to 5.0 parts by mass, with respect to 100 parts by mass of the diene-based polymer (a). Since the content of the coupling agent (d) is 0.5 part by mass or more with respect to 100 parts by mass of the diene-based polymer (a), the effect of suppressing an increase in resistance in the case of application of a rotational load to the elastic body layer 14 is high. In addition, since the content of the coupling agent (d) is 20 parts by mass or less with respect to 100 parts by mass of the diene-based polymer (a), image deterioration caused by bleeding of the unreacted coupling agent (d) is easily suppressed.

As needed, the above composition may contain one or two or more of various additives such as an electronic conductive agent other than the carbon black (c), an ionic conductive agent, a lubricant, an anti-aging agent, a photostabilizer, a viscosity modifier, a processing aid, a reaction aid, a flame retardant, a plasticizer, a foaming agent, a filler, a dispersant, a defoaming agent, a pigment, a mold release agent, and so on.

A thickness of the elastic body layer 14 is not particularly limited, and preferably ranges from 0.1 mm to 10 mm, more preferably ranges from 0.5 mm to 5 mm, and even more preferably ranges from 1 mm to 3 mm for the conductive roll 10.

Volume resistivity of the elastic body layer 14 is not particularly limited, and preferably ranges from $10^2$ Ω·cm to $10^{10}$ Ω·cm, more preferably ranges from $10^3$ Ω·cm to $10^9$ Ω·cm, and even more preferably ranges from $10^4$ Ω·cm to $10^8$ Ω·cm for the conductive roll 10.

The shaft body 12 is not particularly limited as long as it has conductivity. Specific examples of the shaft body 12 include a solid body made of metal such as iron, stainless steel, aluminum or the like, a core bar composed of a hollow body, and so on. An adhesive, a primer or the like may be applied to a surface of the shaft body 12 as needed. The adhesive, the primer or the like may be made conductive as needed.

The conductive roll 10 can be manufactured, for example, as follows. First, the shaft body 12 is installed coaxially in a hollow part of a roll forming die. The above composition is poured, heated and cured, followed by mold release or extrusion molding of the above composition on the surface of the shaft body 12, and so on, thereby forming the elastic body layer 14 on an outer periphery of the shaft body 12. Accordingly, the conductive roll 10 can be manufactured.

According to the conductive roll 10 having the above configuration, since the elastic body layer 14 contains the carbon black (c) and the form of conduction is electronic conduction, variation in resistance due to energization and due to environment can be reduced. Since the carbon black (c) has a particular specific surface area and the coupling agent (d) is the above (d1) or (d2), excellent resistance stability is achieved in the long term in the case of application of a rotational load to the electroconductive elastic body layer 14.

The conductive roll according to the disclosure is suitably used as a conductive roll such as a charging roll, a development roll, a transfer roll, a toner supply roll or the like arranged around a photosensitive drum in an electrophotographic machine such as a copier, a printer, a fax machine or the like that employs electrophotography.

In the disclosure, the conductive roll may be configured to include only the shaft body 12 and the single-layer elastic body layer 14 made of rubber as shown in FIG. 1A and FIG. 1B, or may be configured to further include another layer besides the single-layer elastic body layer 14 made of rubber. Examples of the another layer include a surface layer or an intermediate layer and so on. The surface layer is a layer that appears on a surface of the conductive roll, and is provided for the purposes of protecting the roll surface, imparting surface properties, and so on. The intermediate layer is provided as one or more layers between the shaft body 12 and the single-layer elastic body layer 14 made of rubber or between the single-layer elastic body layer 14 made of rubber and the surface layer or the like. The intermediate layer is provided for the purposes of adjusting electrical resistance of the conductive roll, improving adhesion, preventing the components of the conductive roll from being diffused, and so on.

Figure 2A:
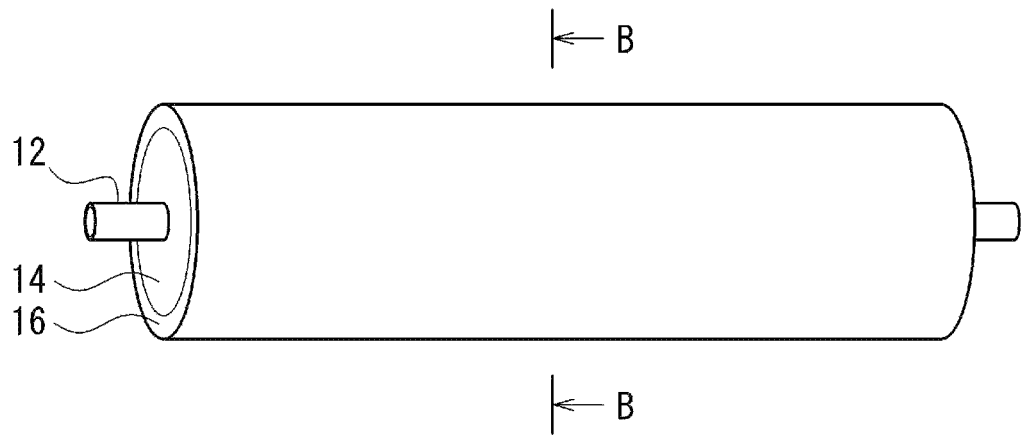
FIG. 2A is a schematic external view of a conductive roll for an electrophotographic machine according to another embodiment of the disclosure.
Figure 2B:
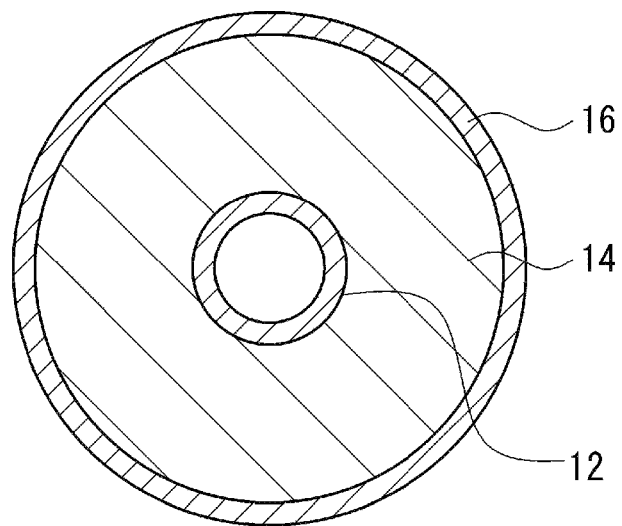
FIG. 2B is a sectional view of FIG. 2A taken along line B-B.

FIG. 2A and FIG. 2B show a conductive roll for an electrophotographic machine according to another embodiment of the disclosure. A conductive roll 20 shown in FIG. 2A and FIG. 2B has a configuration in which the elastic body layer 14 is provided as a single layer on the outer periphery of the shaft body 12, and a surface layer 16 is provided as a single layer on an outer periphery of the elastic body layer 14. The elastic body layer 14 is a base layer of the conductive roll 20. In the conductive roll 20, the elastic body layer 14 is covered by the surface layer 16 without appearing on a surface (outer peripheral surface). The surface layer 16 is a layer that appears on the surface of the conductive roll 20.

Examples of a material of the surface layer 16 include urethane resin, polyamide, acrylic resin, acrylic silicone resin, butyral resin, alkyd resin, polyester resin, fluororubber, fluororesin, silicone resin, acrylic modified silicone resin, silicone modified acrylic resin, fluorine modified acrylic resin, melamine resin, methacrylic resin such as polymethyl methacrylate (PMMA) or the like, polycarbonate, epoxy resin, phenol resin, polybutylene terephthalate, polyacetal, modified polyphenylene oxide (modified polyphenylene ether), polyphenylene sulfide, polyether ether ketone, polyether sulfone, polysulfone, polyamideimide, polyetherimide, polyimide, polyarylate, polyallyl ether nitrile, nitrile rubber, urethane rubber, resins obtained by crosslinking the foregoing, and so on. An ionic conductive agent or an electronic conductive agent, or various additives may be added to the surface layer 16 as needed. The surface layer 16 can be formed by a method such as coating a composition for surface layer formation on the outer periphery of the elastic body layer 14, or the like. The surface layer 16 is subjected to a crosslinking treatment as needed.

In order to impart conductivity to the surface layer 16, a conventionally known conductive agent such as carbon black, graphite, c-$TiO_2$, c-ZnO, c-$SnO_2$ (where "c-" means conductive), an ionic conductive agent (quaternary ammonium salt, borate, surfactant or the like) or the like may be appropriately added. In addition, various additives may be appropriately added as needed. In order to ensure surface roughness, particles for roughness formation may be added.

The particles for roughness formation form surface irregularities on the surface layer 16. Examples of the particles for roughness formation include resin particles, silica particles, and so on. Examples of the resin particles include urethane particles, silicone particles, acrylic particles, and so on. The particles for roughness formation have an average particle diameter preferably ranging from 3 μm to 50 μm. The average particle diameter of the particles for roughness formation can be calculated from a median diameter using a laser diffraction type particle size distribution measuring device.

The composition for surface layer formation contains the above main materials, a conductive agent, and other additives that are contained as needed. Examples of the other additives include a crosslinking agent for a polymer component, a leveling agent, a surface modifier, and so on. From the viewpoint of adjusting viscosity or the like, the composition for surface layer formation may appropriately contain an organic solvent such as methyl ethyl ketone, toluene, acetone, ethyl acetate, butyl acetate, methyl isobutyl ketone (MIBK), THF, DMF or the like, or a solvent such as a water-soluble solvent such as methanol, ethanol or the like. As a coating method, various coating methods such as a roll coating method, a dipping method, a spray coating method or the like is applicable.

A thickness of the surface layer 16 is not particularly limited, and preferably ranges from 0.01 μm to 100 μm, more preferably ranges from 0.1 μm to 20 μm, and even more preferably ranges from 0.3 μm to 10 μm. Volume resistivity of the surface layer 16 preferably ranges from $10^7$ Ω·cm to $10^{12}$ Ω·cm, more preferably ranges from $10^8$ Ω·cm to $10^{11}$ Ω·cm, and even more preferably ranges from $10^9$ Ω·cm to $10^{10}$ Ω·cm.

If the surface layer is not provided as the another layer, the same function as that of the case where the surface layer is provided may be imparted by performing a surface modification treatment that modifies the surface of the elastic body layer 14 made of rubber. Examples of a surface modification method include irradiation with UV or an electron beam, contact with a surface modifier, for example, a compound containing a reactive active group such as an isocyanate group, a hydrosilyl group, an amino group, a halogen group, a thiol group or the like, which is capable of reacting with an unsaturated bond or a halogen of the elastic body layer 14 made of rubber, and so on.

Examples of a material of the intermediate layer include hydrin rubber (CO, ECO, GCO, GECO), ethylene-propylene rubber (EPDM), styrene butadiene rubber (SBR), polynorbornene rubber, silicone rubber, butadiene rubber (BR), isoprene rubber (IR), acrylic rubber (ACM), chloroprene rubber (CR), urethane rubber, urethane-based elastomer, fluororubber, natural rubber (NR), acrylonitrile butadiene rubber (NBR), hydrogenated acrylonitrile butadiene rubber (H-NBR), and so on. An ionic conductive agent or an electronic conductive agent, or various additives may be added to the intermediate layer as needed. The intermediate layer can be formed by molding a composition for intermediate layer formation on the outer periphery or the like of the elastic body layer 14 made of rubber by a method such as injection molding, extrusion molding or the like. The intermediate layer is subjected to a crosslinking treatment as needed.

EXAMPLES

Hereinafter, the disclosure is described in detail by way of examples and comparative examples. In the examples, a charging roll having a two-layer structure in which a base layer and a surface layer are laminated in this order on an outer periphery of a shaft body is given as an example. However, the disclosure is not limited to this configuration.

The following materials were prepared as materials of a composition for elastic body layer formation.

Diene-Based Polymer (a)
  Nitrile rubber: NBR, "Nipol DN302" made by Zeon Corporation Crosslinking agent (b)
  Peroxide: "PERCUMYL D40" made by NOF CORPORATION Carbon Black (c)
  Carbon 1: "SEAST SO" made by Tokai Carbon, having a specific surface area of 42 $m^2/g$
  Carbon 2: "SEAST 9" made by Tokai Carbon, having a specific surface area of 142 $m^2/g$
  Carbon 3: "BLACK PEARLS 880" made by Cabot, having a specific surface area of 240 $m^2/g$ Coupling Agent (d)
  (d1) Coupling agent 1: "S-(3-aminopropyl) hydrogen thiosulfate" made by Sigma-Aldrich
  (d2) Coupling agent 2: "1-(4-aminophenyl)-1H-pyrrole-2,5-dione" made by Sigma-Aldrich Additive (e)
  Stearic acid (processing aid): Stearic acid "Sakura" made by NOF CORPORATION
  Zinc oxide (reaction aid): "Zinc Oxide No. 2" made by Sakai Chemical Industry Co., Ltd.
  Hydrotalcite (reaction aid): "DHT-4A" made by Kyowa Chemical Industry Co., Ltd.

Others (f)
  Comparative material 3: butylamine (reagent)
  Comparative material 4: 1-butanethiol (reagent)

Example 1

<Preparation of Composition for Elastic Body Layer Formation>

With respect to 100 parts by mass of NBR, 0.7 part by mass of stearic acid, 5 parts by mass of zinc oxide, 2 parts by mass of hydrotalcite, 3 parts by mass of a crosslinking agent, 20 parts by mass of carbon black (Carbon 2), and 2 parts by mass of a coupling agent (Coupling agent 1) were blended with each other, and stirred and mixed by a stirrer, thereby preparing a composition for elastic body layer formation according to Example 1.

<Production of Elastic Body Layer>

A core bar (having a diameter of 6 mm) was set in a forming die. The above composition was poured, heated at 170° C. for 30 minutes, followed by cooling and mold release, thereby forming, on an outer periphery of the core bar, an elastic body layer composed of a conductive rubber elastic body having a thickness of 1.75 mm.

<Production of Surface Layer>

100 parts by mass of N-methoxymethylated nylon ("EF30T" made by Nagase ChemteX Corporation), 60 parts by mass of a conductive tin oxide ("S-2000" made by Mitsubishi Materials Corporation), 30 parts by mass of urethane particles ("ART PEARL C-600" made by Negami Chemical Industrial Co., Ltd., having an average particle diameter of 10 μm), 1 part by mass of citric acid (crosslinking agent) and 300 parts by mass of methanol were mixed, thereby preparing a composition for surface layer formation. Next, the composition for surface layer formation was roll-coated on a surface of the elastic body layer, and heated at 120° C. for 50 minutes, thereby forming a surface layer having a thickness of 10 μm on an outer periphery of the elastic body layer. Accordingly, a charging roll according to Example 1 was fabricated.

Examples 2 to 4

A charging roll was fabricated in the same manner as in Example 1 except that the blending amount of Coupling agent 1 was changed in the preparation of the composition for elastic body layer formation.

Examples 5 to 6

A charging roll was fabricated in the same manner as in Example 2 except that the blending amount of carbon black (Carbon 2) was changed in the preparation of the composition for elastic body layer formation.

Examples 7 to 8

A charging roll was fabricated in the same manner as in Example 1 except that the type of carbon black was changed in the preparation of the composition for elastic body layer formation.

Example 9

A charging roll was fabricated in the same manner as in Example 1 except that the type of the coupling agent was changed in the preparation of the composition for elastic body layer formation.

Comparative Example 1

A charging roll was fabricated in the same manner as in Example 1 except that Comparative material 3 was used in place of Coupling agent 1 in the preparation of the composition for elastic body layer formation.

Comparative Example 2

A charging roll was fabricated in the same manner as in Example 1 except that Comparative material 4 was used in place of Coupling agent 1 in the preparation of the composition for elastic body layer formation.

Comparative Example 3

A charging roll was fabricated in the same manner as in Example 1 except that no coupling agent was blended in the preparation of the composition for elastic body layer formation.

With respect to each of the fabricated charging rolls, change in resistance and bleeding were evaluated. The evaluation results and the blending composition (parts by mass) of the composition for elastic body layer formation are shown in the following table.

<Method for Evaluating Change in Resistance>

In a state in which a fabricated charging roll having one end applied with a load of 500 g (i.e., 1 kg in total at both ends) was on a metal drum of 30 mm in diameter, the metal drum was rotated at 90 rpm for 2 hours. Resistance values before and after a test of applying −200 V were obtained, and a change in resistance was calculated in terms of the number of digits. If the change in resistance was less than 0.1 digit, the change in resistance was small and evaluated as "○"; if the change in resistance was 0.1 digit or more, the change in resistance was large and evaluated as "x".

<Bleeding>

The fabricated charging roll was left still in a predetermined humid and hot environment for 14 days, and it was observed whether there was a bleeding product on a surface of the charging roll. A case where no bleeding product was observed even in a humid and hot environment of 50° C. and 95% RH was evaluated as "○"; a case where a bleeding product was observed in a humid and hot environment of 50° C. and 95% RH and no bleeding product was observed in a humid and hot environment of 40° C. and 95% RH was evaluated as "Δ".

TABLE 1

| | | | | Example 1 | Example 2 | Example 3 | Example 4 | Example 5 | Example 6 | Example 7 | Example 8 | Example 9 | Comparative Example 1 | Comparative Example 2 | Comparative Example 3 |
|---|---|---|---|---|---|---|---|---|---|---|---|---|---|---|---|
| Elastic body layer | Polymer | NBR | | 100 | 100 | 100 | 100 | 100 | 100 | 100 | 100 | 100 | 100 | 100 | 100 |
| | Processing aid | Stearic acid | | 0.7 | 0.7 | 0.7 | 0.7 | 0.7 | 0.7 | 0.7 | 0.7 | 0.7 | 0.7 | 0.7 | 0.7 |
| | Reaction aid | Zinc oxide | | 5 | 5 | 5 | 5 | 5 | 5 | 5 | 5 | 5 | 5 | 5 | 5 |
| | Reaction aid | Hydrotalcite | | 2 | 2 | 2 | 2 | 2 | 2 | 2 | 2 | 2 | 2 | 2 | 2 |
| | Crosslinking agent | Peroxide | | 3 | 3 | 3 | 3 | 3 | 3 | 3 | 3 | 3 | 3 | 3 | 3 |
| | Conductive agent | Carbon 1 | Specific surface area of 42 m$^2$/g | | | | | | | 20 | | | | | |
| | | Carbon 2 | Specific surface area of 142 m$^2$/g | 20 | 20 | 20 | 20 | 10 | 45 | | | 20 | 20 | 20 | 20 |
| | | Carbon 3 | Specific surface area of 240 m$^2$/g | | | | | | | | 20 | | | | |
| | Coupling agent 1 | | NH$_2$ group, S radical | 5 | 20 | 0.5 | 30 | 5 | 5 | 5 | 5 | | | | |
| | Coupling agent 2 | | NH$_2$ group, ene group | | | | | | | | | 5 | | | |
| | Comparative material 3 | | NH$_2$ group only | | | | | | | | | | 0.72 | | |
| | Comparative material 4 | | SH group only | | | | | | | | | | | 0.88 | |
| Evaluation results | Change in resistance | | | ○ | ○ | ○ | ○ | ○ | ○ | ○ | ○ | ○ | x | x | x |
| | Bleeding | | | ○ | ○ | ○ | Δ | ○ | ○ | ○ | ○ | ○ | ○ | ○ | ○ |

Regarding a composition in which a diene-based polymer, a peroxide crosslinking agent, and carbon black having a predetermined specific surface area were blended with each other, no coupling agent was blended in Comparative Examples 1 to 3. In Comparative Example 1, butylamine was blended in place of the coupling agent; in Comparative Example 2, 1-butanethiol was blended in place of the coupling agent. In Comparative Examples 1 to 3, when a rotational load was applied to the electroconductive elastic body layer, the change in resistance increased, and an increase in resistance was confirmed. Hence, it is clear that the resistance stability is poor in long-term use. On the other hand, in the examples, since particular coupling agents were blended in the composition in which the diene-based polymer, the peroxide crosslinking agent, and the carbon black having a predetermined specific surface area were blended with each other, even if a rotational load is applied to the electroconductive elastic body layer, the change in resistance was small, and it is clear that an increase in resistance was suppressed. Hence, it is clear that the resistance stability is excellent in long-term use.

According to the conductive roll for an electrophotographic machine according to the disclosure, since the elastic body layer contains carbon black (c) and the form of conduction is electronic conduction, variation in resistance due to energization and due to environment can be reduced. Since carbon black (c) has a particular specific surface area and the coupling agent (d) is (d1) a coupling agent having a $NHR^1$ group and a $SSO_3H$ group or (d2) a coupling agent having a $NHR^1$ group and an ene structure (where $R^1$ is H or a hydrocarbon group having 1 to 8 carbon atoms), excellent resistance stability is achieved in the long term in the case of application of a rotational load to an electroconductive elastic body layer.

While particular embodiments and examples of the disclosure have been described above, the disclosure is not limited to the above embodiments and examples, and various modifications can be made without departing from the spirit of the disclosure.

What is claimed is:

1. A conductive roll for an electrophotographic machine, the conductive roll being a charging roll and comprising:
   a shaft body; and
   an elastic body layer formed on an outer periphery of the shaft body, wherein the elastic body layer is a crosslinked body of a composition containing:
   a diene-based polymer (a),
   a crosslinking agent (b),
   a carbon black (c), and
   a coupling agent (d), wherein
   the crosslinking agent (b) is a sulfur crosslinking agent or a peroxide crosslinking agent;
   the carbon black (c) has a specific surface area ranging from 40 $m^2/g$ to 300 $m^2/g$, and a content of the carbon black (c) in the composition ranges from 10 parts by mass to 45 parts by mass with respect to 100 parts by mass of the diene-based polymer (a); and
   the coupling agent (d) is (d1) or (d2) below, and a content of the coupling agent (d) in the composition ranges from 0.5 part by mass to 20 parts by mass with respect to 100 parts by mass of the diene-based polymer (a):
   (d1) a coupling agent having a $NHR^1$ group and a $SSO_3H$ group;
   (d2) a coupling agent having a $NHR^1$ group and an ene structure, wherein
   $R^1$ is H or a hydrocarbon group having 1 to 8 carbon atoms.

* * * * *